United States Patent [19]

Yokoyama et al.

[11] Patent Number: 4,529,886
[45] Date of Patent: Jul. 16, 1985

[54] IMAGE SENSING APPARATUS

[75] Inventors: Shotaro Yokoyama; Takashi Nishibe, both of Yokosuka, Japan

[73] Assignee: Fuji Electric Corporate Research & Development Co., Ltd., Kawasaki, Japan

[21] Appl. No.: 483,362

[22] Filed: Apr. 8, 1983

[30] Foreign Application Priority Data

Apr. 28, 1982 [JP] Japan .................................. 57-72350

[51] Int. Cl.³ ........................ H01J 40/14; H04N 3/15
[52] U.S. Cl. ..................................... 250/578; 357/32; 358/213
[58] Field of Search ................. 250/578, 211 J, 211 R; 357/30, 31, 32, 24 LR; 358/212, 213, 167

[56] References Cited

U.S. PATENT DOCUMENTS 3,822,362 7/1974 Weckler et al. .................... 358/213
3,936,630 2/1976 Blossfeld .......................... 250/211 J
4,360,833 11/1982 Kinoshita et al. .................... 358/213

*Primary Examiner*—Edward P. Westin
*Attorney, Agent, or Firm*—Brumbaugh, Graves, Donohue & Raymond

[57] ABSTRACT

An image sensing system comprises an array of photosensors each adapted to sense the light intensity in a respective portion of an image, and circuitry for scanning the photosensor in the array including a plurality of pulse generation circuits corresponding to respective photosensors and each providing a pulse delayed with respect to the beginning of a scanning operation by an interval approximately inversely proportional to the light intensity sensed by its corresponding photosensor. In addition, the system includes a plurality of memory storage locations, each one associated with a respective photosensor and its corresponding pulse generation circuit, and adapted to store a multiple bit code. Furthermore, the system includes circuitry which analyzes the sequential order in which the delayed pulses of the pulse generation circuits are provided and causes to be stored in each of the memory locations a code indicative of the position of the pulse generation circuit associated with the memory location in the aforementioned sequential order. Since the order in which the pulse generation circuits provide their respective pulses is dependent on the light intensities sensed by their corresponding photosensors, the code stored in each memory location indicate the order of the light intensity sensed by the photosensor associated with the memory location.

10 Claims, 14 Drawing Figures

IMAGE SENSING APPARATUS

BACKGROUND OF THE INVENTION

The present invention relates to image sensing apparatus which convert an optical image into electrical signals representative of the image, and more particularly to image sensing apparatus which utilize an array of integrated semiconductor photosensors.

Image sensing apparatus which utilize an array of semiconductor photosensors are known in the art, and are used in a variety of equipment, such as television cameras and automatic focussing systems for cameras. One widely used type of image sensing apparatus includes an array of charge couple devices (CCD's) integrated on a single chip of semiconductive material. Such chips provide for sensing of an optical image and for scanning of the image to provide electrical signals representative of the image. However, for applications in automatic focussing systems, the size limitation on the photosensor array are such that CCD array chips made according to present technology are too large. Therefore, to use CCD arrays in such applications, it is necessary to reduce the size of the CCD chips by increasing the packing density in such chips through a reduction in the electrode dimensions of the CCD cells and the spacing between the cells in the array. But, a reduction in the electrode dimensions of the CCD cells reduces the charge storage capacity of the cells, and thereby decreases the dynamic range of the image sensing system. As a consequence of the reduced dynamic range, a CCD array small enough for use in an automatic focussing system is susceptible to the problem of image blooming. Moreover, increasing the packing density in CCD chips manufactured by present technology would also reduce the manufacturing yield of such chips, and therefore would increase the cost of such chips.

Smaller photosensor arrays can be achieved without sacrificing dynamic range or manufacturing yield by replacing the CCD arrays with arrays of photodiodes. However, prior image sensing apparatus using photodiode arrays have problems which will now described with aid of FIG. 1. With reference to FIG. 1, there is shown a schematic circuit diagram of a photodiode image sensing array 100, illustrated as a one-dimensional array. The photodiodes 2 are arranged in the focal plane of an imaging system (not shown in FIG. 1) and serve to detect the light intensity in a respective portion of an image in the focal plane. Each photodiode is connected to a capacitance 3, which stores a voltage related to the intensity of light detected by the photodiode, and a transfer gate (a field-effect transistor) 4 which operatively couples the voltage on the capacitance 3 to a common sense line 6. The transfer gates 4 are sequentially gated by gating signals provided by a shift register 1, and the voltages on the capacitances 3 are sequentially placed on the common sense line 6. The sense line 6 is connected to an analog-to-digital (A/D) converter 5 which converts the analog voltage on the sense line 6 to a digital code representative of the voltage. Thus, the A/D converter 5 provides a sequence of digital codes representative of the intensities of light detected by the photodiodes 2 of the array.

One problem with the photosensor arrangement of FIG. 1 is that as the array became larger, the ratio of the parasitic capacitance $C_L$ of the sense line 6 to the value of the capacitance C associated with each photodiode becomes larger. As a consequence, the signal-to-noise ratio of the voltage signal on the sense line 6 becomes smaller. The main source of noise on the sense line 6 is the switching noise from the gating of the transfer gates 4.

One known solution to the signal to noise problem in the prior art photodiode image sensor arrays is to decrease the capacitance ratio $C_L/C$ by dividing the sense line 6 into several parts. However, a drawback of this solution is that each part of the sense line requires a separate A/D converter, and the use of multiple A/D converters causes the size of the chip to become too large. Another known solution is to the signal-to-noise problem of prior art photodiode image sensor arrays is to provide each photodiode with associated circuitry for providing a digital code representing the photocurrent of the diode. However, owing to the necessarily simple nature of such encoding circuits, the digital codes provided by such circuits generally do not contain sufficient information to accurately represent the photocurrent of the photodiode. Therefore, a need clearly exists for a photodiode array type image sensing apparatus which has a relatively high signal-to-noise ratio and which provides sufficient digital information for accurate represenation of the image for the purposes of comparing images, and yet be of simple construction and easily manufactured.

SUMMARY OF THE INVENTION

Accordingly, the problems of the prior art are substantially improved by the present invention which is an image sensing apparatus which utilizes a plurality of photosensors arranged in an array in the focal plane of an optical imaging system, each photosensor being adapted to sense the light intensity in a respective portion of an image in the focal plane and to provide an electrical signal represenative of the sensed light intensity. The system further comprises circuitry for scanning the array of photosensors including a plurality of pulse generation circuits, each one corresponding to a respective one of the photosensors and providing a pulse which is delayed with respect to the beginning of a scanning operation by an interval related to the light intensity sensed by the corresponding photosensor. In addition, the system includes a plurality of memory storage locations, each associated with a respective one of the photosensors and its corresponding pulse generation circuit, and being adapted to store a multiple bit code. Furthermore, the system includes circuitry for analyzing the sequential order in which the delayed pulses from the plurality of pulse generation circuits are provided, with respect to regular predetermined intervals, and for storing in each of the memory locations a code indicative of the position in the sequential order assigned to the pulse generation circuits associated with that memory location. If two or more of the pulse generation circuits provide pulses in the same predetermined interval, those circuits are assigned the same position in the sequential order, and the same code is stored in the memory locations associated with those circuits. Since the order in which the pulse generation circuits provide their pulses is dependent on the light intensity sensed by their corresponding photosensors, the codes stored in the plurality of memory locations reflect the order of the light intensities sensed by the photosensors associated with the memory locations.

DETAILED DESCRIPTION

Figure 1:
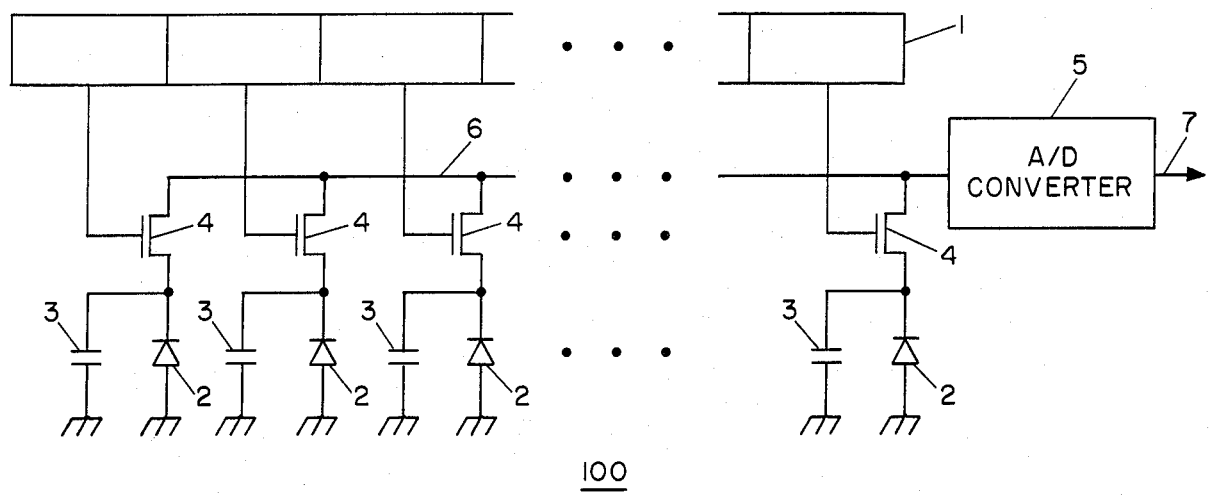
FIG. 1 is a schematic circuit diagram of a photodiode image sensor array and associated scanning and coding circuits according to the prior art.
Figure 2:
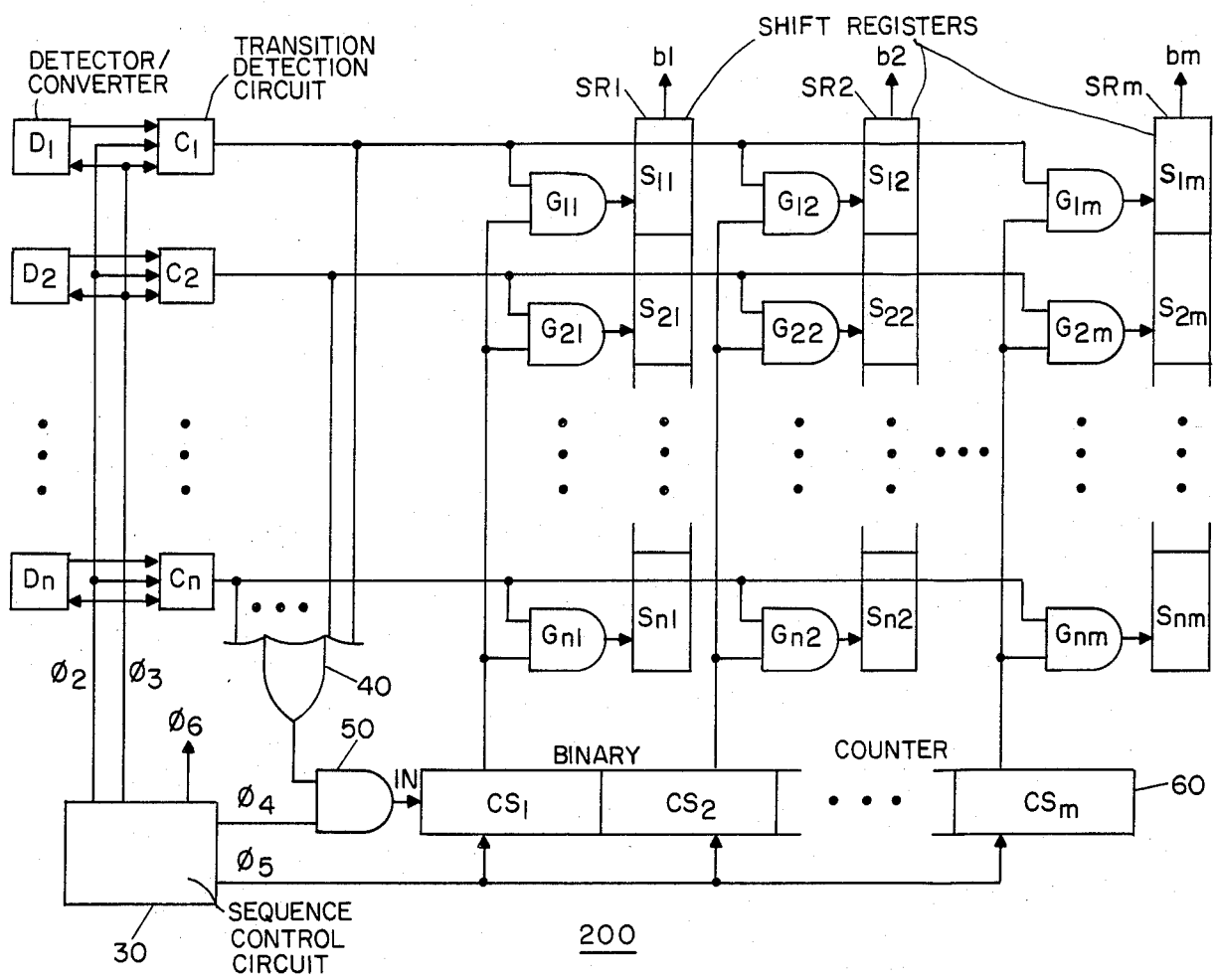
FIG. 2 is a schematic block and logic diagram of an image sensing system according to one embodiment of the present invention.

Referring now to FIG. 2 there is shown an image sensing system 200 according to one embodiment of the present invention. The system includes an array of n (where n is a relatively large positive whole number) detector/converters D1–Dn. Each of the detector/converters includes a photodiode (not shown in FIG. 2) situated in a focal plane of an optical imaging system (not shown in FIG. 2) and adapted to sense the light intensity of a respective portion of an image in the focal plane and to provide a photocurrent which is approximately proportional to the sensed light intensity. In addition, each of the detector/converters D1–Dn includes circuitry which provide a negative-going logical pulse having a pulsewidth which is approximately inversely proportional to the photocurrent of the photodiode. It is noted that detector/converters which provide a positive-going pulse may likewise be used with appropriate modifications to the system as will become obvious to one skilled in the art from the following description of the system. Suitable configurations for the circuitry used in the detector/converters will be discussed subsequently in connection with FIG. 3. The detector/converters are initialized at the beginning of a scanning operation by a clock signal $\phi_3$ provided by a sequence control circuit 30, the initialization causing their outputs to go to a logic "0" level. Hereinafter, a logic "0" level will be referred to as a "0". After initialization, the output of each detector/converter returns to a logic "1" level following a delay that is approximately inversely proportional to the light intensity sensed by the photodiode therein. Hereinafter, a logic "1" level will be referred to as a "1".

Each detector/converter is connected to an associated transition detection circuit C1–Cn. The transition detection circuits are all initialized at the beginning of a scanning operation to have a "0" output by the $\phi_3$ clock signal. Thereafter, each transition detection circuit provides a positive going pulse which begins with the "0" to "1" transition of the output of its associated detector/converter and terminates with the beginning of the next pulse of the $\phi_2$ clock signal from the sequence control circuit 30. The outputs of the transition detection circuits C1–Cn are provided to an n-input OR gate 40. The output of the OR gate 40 is provided to a 2-input AND gate 50, which also receives a clock signal $\phi_4$ from the sequence control circuit 30. When the output of OR gate 40 is a "1", the AND gate 50 is enabled to pass the clock signal $\phi_4$.

The output of gate 50 is provided to a binary counter 60. The counter 60 is a down-counter with m stages CS1–CSm (where m is a positive whole number greater than or equal to log n/log 2). Each stage of the counter is initialized to "1" at the beginning of a scanning operation by a clock signal $\phi_5$ provided by the sequence control circuit 30. It will be obvious to those skilled in the art that an up-counter may be substituted as the counter 60 with appropriate modifications such as the addition of an inverter at the output of each stage and the initialization of the stages CS1–CSm to a "0" instead of a "1". The design of such counters will be well known to those skilled in the art of logic circuit design, and therefore need not be further described.

The image sensing system 200 includes m shift registers SR1–SRm, each having n stages. The shift register stages S11–Snm serve as memory elements, and can be viewed as being arranged in a matrix having m columns and n rows. Each shift register stage is connected to receive the output of an associated 2-input AND gate G11–Gnm. Each column of the matrix of memory elements corresponds to a respective one of the counter stages CS1–CSm, and all AND gates associated with the memory elements of that column have one of their inputs connected to receive the output of the corresponding counter stage. Therefore, when the state of a counter stage is "1", all the AND gates associated with memory elements of the column corresponding to the counter stage are enabled. Each row of the matrix of memory elements corresponds to a respective one of the transition detection circuits C1–Cn, and all AND gates associated with the memory elements of that row have one of their inputs connected to the output of the transition detection circuit corresponding to that row.

All the shift register stages S11–Snm are initialized to "0" at the start of a scanning operation by means of an appropriate signal applied to a set terminal of each shift register (not shown in FIG. 2). It is noted that for the case where a up-counter is used for the counter 60, the shift register stages S11–Snm must all be initialized to a "1" instead of a "0". After completion of a scanning operation, the contents of the shift registers SR1–SRm are serially shifted out in unison through their respective outputs b1–bm by means of appropriate signals applied to proper terminals (not shown in FIG. 2) of each shift register. Each shift register stage is reset to a "0" upon receiving a "1" from its associated AND gate. In the case where a up-counter is used, each shift register stage is set to a "1" upon receiving a "1" from its associated AND gate. The design of shift registers to perform the above-defined functions will be well known to those skilled in the art of logic circuit design, and therefore need not be further described.

Figure 3:
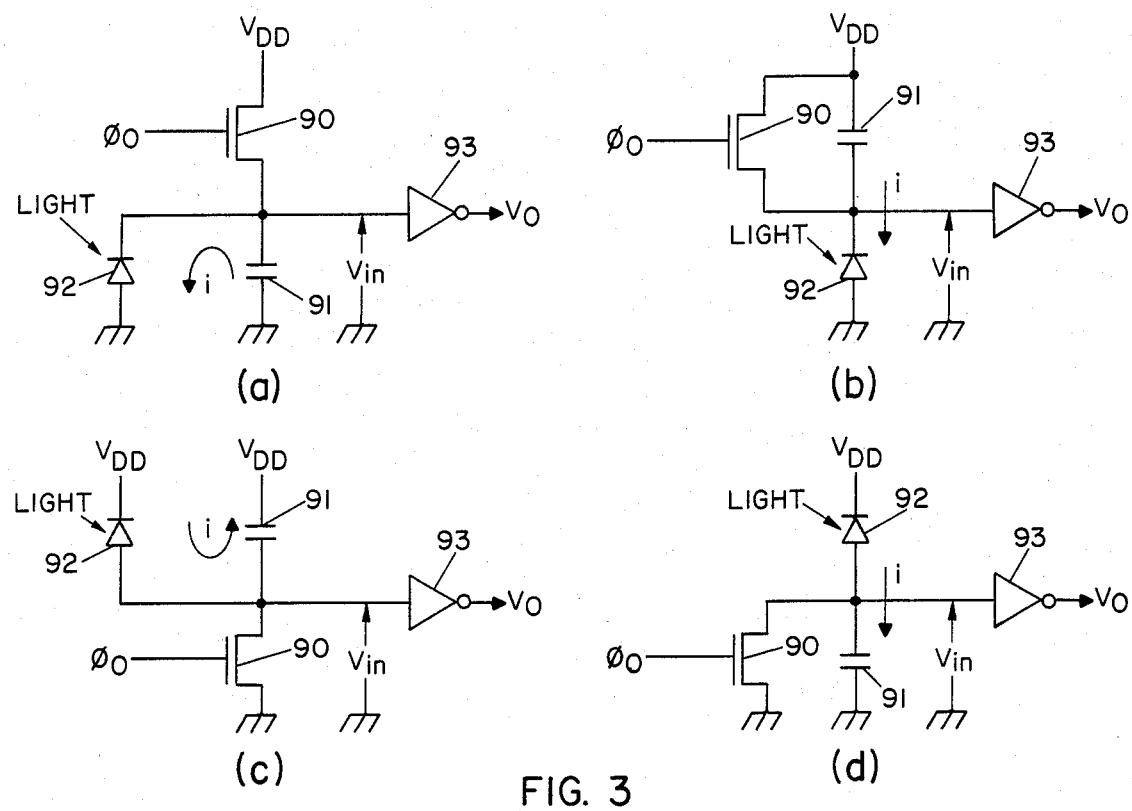
FIG. 3 is a schematic circuit diagram of four alternative configurations for a detector/converter circuit suitable for use in the image sensing system of FIG. 2.

Turning now to FIG. 3, there are shown schematic circuit diagrams of four alternative configurations (a)–(d) of a detector/converter suitable for use in the image sensing system of FIG. 2. Two of the configurations (a) and (b) provide negative-going pulses having pulse-widths which are approximately inversely proportional to the sensed light intensity, while the other two configurations (c) and (d) provide positive-going pulses having pulse-widths which are approximately inversely proportional to the sensed light intensity. In configuration (a) a photodiode 92, providing a photocurrent i approximately proportional to the light intensity received thereby, has its cathode connected to the input of an inverter 93 and its anode connected to ground. A capacitance 91 is coupled in parallel to the photodiode 92. A transfer gate 90 (a field effect transisitor) is connected between a $V_{DD}$ supply and the input of the inverter 93; the gate of the transfer gate 90 receives a clock signal $\phi_0$ derived from the clock signal $\phi_3$ provided by the sequence control circuit 30. At the beginning of a scanning operation, the transfer gate is driven to the ON state by the clock signal $\phi_0$, and the capacitance 91 is charged to $V_{DD}$, which is a "1". Under these conditions, the output voltage $V_o$ of the inverter 93 is initially a "0". Thereafter, the transfer gate 90 is driven to the OFF state by $\phi_0$, and the photocurrent i of the photodiode 92 causes the capacitance 91 to discharge. When the voltage across the capacitance $V_{in}$ decreases below the threshold voltage of the inverter 93, the output voltage of the inverter $V_o$ goes to a "1".

In configuration (b) the photodiode is connected between the input of an inverter 93 and ground. A capacitance 91 is connected between a $V_{DD}$ supply and the input of the inverter 93, and a transfer gate 90 is connected across the capacitance. At the beginning of a scanning operation, the transfer gate 90 is driven to the ON state by the $\phi_0$ clock signal, and the capacitance 91 is discharged. Under these conditions, the input voltage $V_{in}$ of the inverter 93 is approximately $V_{DD}$, and the output voltage of the inverter $V_o$ is initially a "0". Thereafter, the transfer gate is driven to the OFF state by $\phi_0$, and the capacitance 91 is charged by the photocurrent i of the photodiode, causing $V_{in}$ to decrease toward ground. When $V_{in}$ decreases below the threshold voltage of the inverter 93, $V_o$ goes to a "1".

In configuration (c) the photodiode 92 has its cathode connected to a $V_{DD}$ supply and its anode connected to the input of an inverter 93. A capacitance 91 is connected in parallel with the photodiode 92, and a transfer gate 90 is connected between the input of the inverter 93 and ground. At the beginning of a scanning operation, the transfer gate 90 is driven to the ON state by the $\phi_0$ clock signal, and the capacitance 91 is charged to a voltage of approximately $V_{DD}$. Under these conditions, the initial value of the input voltage $V_{in}$ of the inverter 93 is approximately ground, and the output voltage $V_o$ of the inverter 93 is initially at a "1". Thereafter, the transfer gate 90 is driven to the OFF state by $\phi_0$, and the capacitance 91 is discharged by the photocurrent i of the photodiode 92, causing $V_{in}$ to rise towards $V_{DD}$. When $V_{in}$ rises above the threshold voltage of the inverter 93, $V_o$ goes to a "0".

In configuration (d), the photodiode 92 is connected between a $V_{DD}$ supply and the input of an inverter 93. A capacitance 91 is connected between the input of the inverter 93 and ground, and a transfer gate 90 is connected across the capacitance 91. At the beginning of a scanning operation, the transfer gate 90 is driven to its ON state by the signal $\phi_0$, and the capacitance 91 is discharged. Under these conditions, the input voltage $V_{in}$ of the inverter 93 is approximately ground, and the output voltage $V_o$ of the inverter 93 is a "1". Thereafter, the transfer gate 90 is driven to its OFF state by the signal $\phi_0$, and the capacitance is charged by the photocurrent i of the photodiode 92, causing $V_{in}$ to rise towards $V_{DD}$. When $V_{in}$ rises above the threshold voltage of the inverter $V_o$ goes to a "0". The configurations of the detector/converters described above are also disclosed in commonly assigned, copending U.S. patent applications bearing Ser. Nos. 483,248 and 483,247 filed contemporaneously with the present application.

Figure 4:
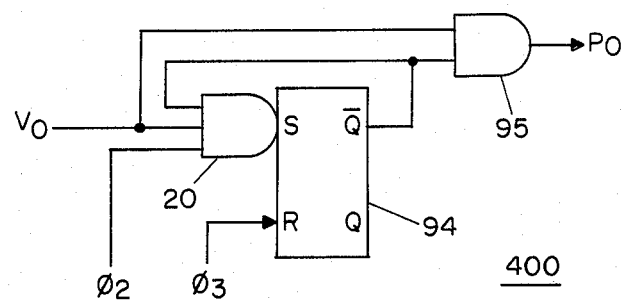
FIG. 4 is a schematic logic diagram of one configuration for a transition detection circuit suitable for use in the image sensing system of FIG. 2.

Referring now to FIG. 4, there is shown a schematic logic diagram of one configuration for a transition detection circuit 400 suitable for use in the image sensing system of FIG. 2. The circuit 400 includes an S-R flip-flop 94 having an S input for setting the flip-flop, an R input for resetting the flip-flop, a normal output Q and an inverted output $\overline{Q}$. The circuit 400 also includes a 3-input AND gate 20, which receives the output signal $V_o$ from a detector/converter, a clock signal $\phi_2$ provided by the sequence control circuit 30, and the inverted output $\overline{Q}$ of the flip-flop 94, and provides its output to the S input of the flip-flop 94. In addition, the circuit includes a 2-input AND gate 95, which receives the $V_o$ signal from the detector/converter and the $\overline{Q}$ output of the flip-flop 94 and provides the output signal $P_o$ of the circuit 400. The R input of the flip-flop 94 receives the $\phi_3$ clock signal from the sequence control circuit 30.

Figure 5:
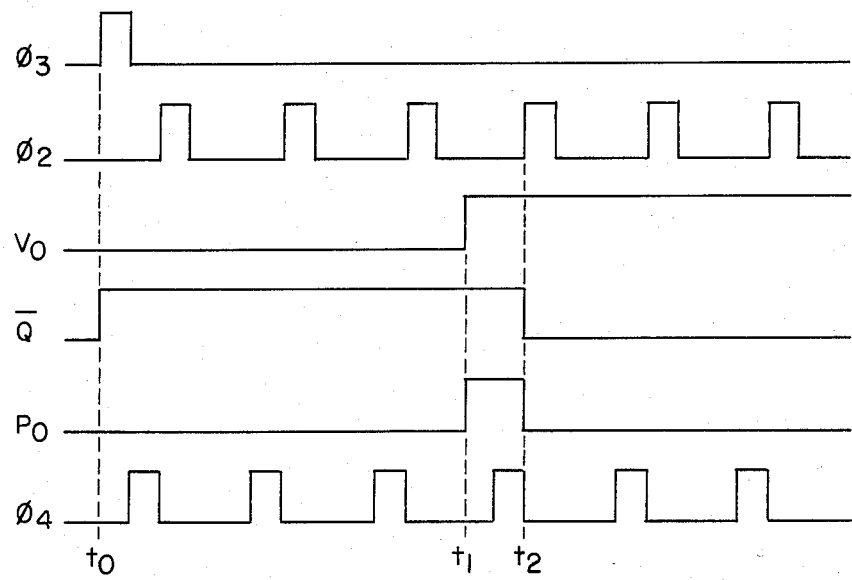
FIG. 5 illustrates the waveforms of the input, output and internal signals of the circuit of FIG. 4, the waveforms being explanatory of the operation of that circuit.

Turning now to FIG. 5 there are shown waveforms of the input signals $V_o$, $\phi_2$ and $\phi_3$, the output signal $P_o$ and an internal signal $\overline{Q}$ of the circuit of FIG. 4. The operation of the circuit of FIG. 4 is now explained with the aid of those waveforms. At the beginning of a scanning operation, at time $t_o$, the flip-flop 94 is reset by the $\phi_3$ signal, and the inverted output $\overline{Q}$ of the flip-flop goes to a "1", causing the AND gate 95 to be enabled. When the output $V_o$ of the detector/converter connected to the transition detection circuit 400 goes to a "1" at time $t_1$ after a delay which is approximately inversely proportional to the light intensity sensed by the photodiode of the detector/converter, the output signal $P_o$ goes to a "1", and the AND gate 20 becomes enabled. Subsequently, at the next occurrence of a $\phi_2$ pulse at time $t_2$, the flip-flop 94 is set, and its $\overline{Q}$ output goes to a "0", causing AND gates 20 and 50 to become disabled and the output signal $P_o$ of the circuit to go to a "0". Thereafter, the transition detection circuit no longer responds to transitions in $V_o$ until reset by a $\phi_3$ pulse. Thus the transition detection circuit provides a positive-going pulse which commences with the "0" to "1" transition of the $V_o$ signal from a detector/converter circuit and terminates at the leading edge of the $\phi_2$ pulse immediately following the transition of $V_o$. Also illustrated in FIG. 5 is the waveform of the $\phi_4$ clock signal provided by the sequence control circuit 30. The $\phi_4$ signal is a periodic sequence of positive-going pulses having the same period and pulse-width as the $\phi_2$ signal, but is shifted in phase such that the trailing edge of a $\phi_4$ pulse is coincident with the leading edge of a $\phi_2$ pulse.

Figure 6:
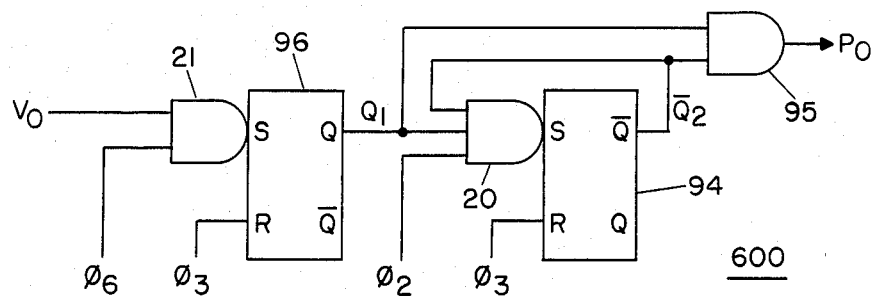
FIG. 6 is a schematic logic diagram of an alternative configuration for a transition detection circuit suitable for use in the image sensing system of FIG. 2.

The transition detection circuit of FIG. 4 has a potential fault in that if a transition in the $V_o$ signal occurs in the middle of a $\phi_2$ pulse, a race condition may exist which would cause erroneous operation of the circuit. This potential fault is removed in the transition detection circuit of FIG. 6 in which the same reference characters and numerals used in FIG. 4 are again used in FIG. 6 to denote like components or parts of the circuit. Referring now to FIG. 6, there is shown a schematic logic diagram of an alternative configuration 600 for a transition detection circuit suitable for use in the image scanning system of FIG. 2. The circuit of FIG. 6 includes the circuit of FIG. 4, but with the addition of a delay stage comprising a S-R flip-flop 96 and a 2-input AND gate 21. The AND gates 95 and 20, instead of directly receiving the signal $V_o$ from a detector/converter as in the circuit of FIG. 4, receive the normal output $Q_1$ of flip-flop 96. The AND gate 21 receives the $V_o$ signal and a $\phi_6$ clock signal provided by the sequence control circuit 30. The R inputs of both flip-flops 94 and 96 receive the $\phi_3$ clock signal.

Figure 7:
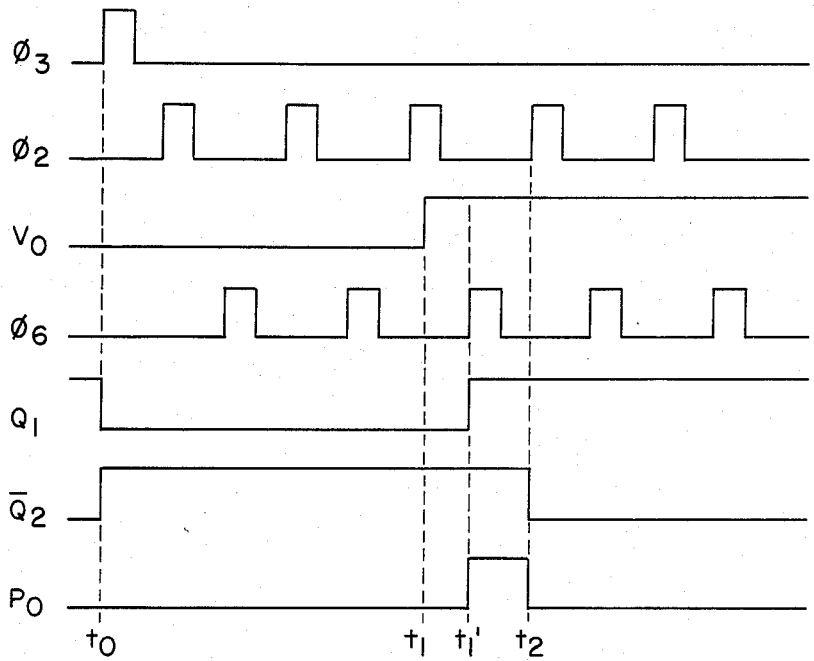
FIG. 7 illustrates the waveforms of the input, output and internal signals of the circuit of FIG. 6, the waveforms being explanatory of the operation of that circuit.

Turning now to FIG. 7 there are illustrated the waveforms of the input signals $V_o$, $\phi_2$, $\phi_3$ and $\phi_6$, the output signal $P_o$, and the internal signals $Q_1$ and $\overline{Q}_2$ of the circuit of FIG. 6. The operation of the circuit of FIG. 6 is now explained with the aid of the waveforms of FIG. 7. Initially, at time $t_0$ both flip-flops 94 and 96 are reset by a $\phi_3$ pulse, causing $Q_1$ to go to a "0" and $\overline{Q}_2$ (the inverted output of flip-flop 94) to go to a "1". Under these conditions the output $P_o$ of the circuit 600 is a "0", and the AND gate 95 is enabled. The $\phi_6$ clock signal is a sequence of pulses having the same period and pulse-width as the $\phi_2$ pulses, but with its phase shifted such that a $\phi_6$ pulse occurs midway between two $\phi_2$ pulses. When $V_o$ makes its "0" to "1" transition at time $t_1$, $Q_1$ remains at a "0" until the beginning of the next $\phi_6$ pulse at time $t_1'$, at which time $Q_1$ goes to a "1" and the output $P_o$ goes to a "1". Subsequently, $P_o$ returns to a "0" at the beginning of the next $\phi_2$ pulse at $t_2$ when the flip-flop 94 is reset. Thus the circuit of FIG. 6 avoids the potential race condition of the circuit of FIG. 4 through the use of an additional flip-flop 96 for delaying the "0" to "1" transition of $V_o$ until the leading edge of the next $\phi_6$ pulse following the transition of $V_o$.

Returning to FIG. 2, the operation of the image scanning system 200 is now explained. At the beginning of a scanning operation, the detector/converters D1-Dn and their associated transition detection circuits C1-Cn are all initialized by the $\phi_3$ signal to have "0" outputs, and the counter stages CS1-CSm are all initialized to "1" by the $\phi_5$ signal. In addition, each of the shift register stages S11-Snm are initialized to a "0". Thereafter the outputs of the detector/converters D1-Dn return to a "1" at various times depending on the light intensities received by the photodiodes therein. Each time a detector/converter makes a "0" to "1" transition, its associated transition detector circuit provides a positive-going pulse which commences with the transition and terminates with the leading edge of the next $\phi_2$ pulse following the transition. The pulse provided by the transition detection circuit is received by one input of each of the AND gate connected to memory elements in the row associated with the pulse detection circuit, and those AND gates in the row which are enabled by a "1" on their other input from corresponding counter stages will cause their associated memory elements to change state from a "0" to a "1". For example, at the start of a scanning operation after all the counter stages CS1-CSm are initialized to a "1" by the $\phi_5$ signal, all the AND gates G11-Gnm of the matrix are enabled, as a result of receiving "1"s on the inputs which are connected to the counter stages. For example, if the transition detection circuit Cj ($1 \leq j \leq n$) provides a pulse, as a result of its associated detector/converter Dj making a "0" to "1" transition, every memory element Sj1-Sjm in the row corresponding to the transition detection circuit Cj will go to a "1". Therefore, the state of the counter 60 is stored in the memory elements of the row associated with the transition detector circuit providing the pulse. Once a pulse from a transition detector circuit has terminated, that circuit provides no further pulses for the remainder of the scanning operation. Therefore, once information is written into the memory elements of a given row of the matrix during a scanning operation, that information is not altered for the remainder of the scanning operation.

The issuance of a pulse from one or more of the transistor detection circuits C1-Cn causes the output of the OR gate 40 to go to a "1" and the AND gate 50 to be enabled. While so enabled, the AND gate 50 can pass a $\phi_4$ pulse from the sequence control circuit 30 to decrement the state of the counter 60. As shown in FIG. 5, the duration of a $P_o$ pulse from a transition detection circuit is such that the AND gate 40 can pass only one $\phi_4$ pulse before being disabled. Therefore, the $P_o$ pulse terminates before information previously stored in a row of memory elements is altered as a result of changed counter stage outputs being applied to the AND gates G11-Gnm of the matrix. Therefore, the counter 60 can be decremented only once in each interval between $\phi_2$ pulses by the issuance of one or more pulses from the transition detection circuits C1-CR during that time interval.

Once the counter 60 has been decremented, the system 200 waits for one or more of the detector/converters whose outputs are still at a "0" to make the "0" to "1" transition. When such transitions occur, the transition detection circuits associated with those detector/converters making the transitions provide pulses to cause the state of the counter 60 to be stored in the memory elements of the row or rows of memory elements which correspond to the detector/converters making such transitions during the interval between two $\phi_2$ pulses. For example, suppose after the counter 60 is decremented from its inital state in which all counter stages CS1-CSm contain a "1" to a state in which CS1 contains a "0" and CS2 to CSm each contain a "1". Under these conditions, the AND gates G11-G1n of the first column of the matrix are all disabled while the other AND gates of the matrix remain enabled. If during the time interval between the two $\phi_4$ pulses, the detector/converters Dk and Dl (where $1 \leq k, 1 \leq n$) both make the "0" to "1" transition, their associated transition detection circuits Ck and Cl, respectively, provide pulses which cause the row of memory elements Sk1-Skm and the row of memory element Sl1-Slm to both store the state of the counter 60. After the counter state has been stored in the rows of memory elements, the counter is decremented to its next state, and the system 200 again waits for "0" to "1" transitions of the remaining detector/converters whose outputs are still at a "0". Therefore, after the first two states of the counter 60, the binary number $2^m$ is stored in the row of memory elements Sj1–Sjm, signifying that detector/converter Dj was the first detector/converter to have its output make the "0" to "1" transition, and therefore the light intensity received by the photodiode in Dj is assigned the highest position in the rank order of the light intensities received by the detector/converters D1–Dn. Furthermore, the binary number $2^m-1$ is stored in both the rows of memory elements Sk1–Skm and the row of memory elements Sl1–Slm, signifying that detector/converters Dk and Dl both made the "0" to "1" transition during the same time interval between two $\phi_4$ pulses, and therefore the light intensities received by photodiodes in Dk and Dl are assigned the same position in the rank order of the light intensities received by the detector/converters D1–Dn.

The steps of storing the state of the counter 60 in the rows of the matrix of memory elements in accordance with the order in which the detector/converter elements corresponding to the rows make the "0" to "1" transition, and of decrementing the counter 60 when one or more such transitions occur during the time interval between two $\phi_4$ pulses continue until all the detector/converters have made the "0" to "1" transition or after a specified period of time. At that point the scanning operation is completed, and the rows of the matrix of memory elements contain binary numbers of zero or greater, which indicate the rank order of the detector/converters D1–Dn according to the intensities of the light received by the photodiodes therein. The binary numbers in the rows of the matrix can be read out by serially shifting out the contents of the shift registers SR1–SRm in unison through their respective outputs b1–bm.

It is noted that the design of a sequence control circuit 30 for providing the clock signals $\phi_2$, $\phi_3$ and $\phi_4$ as shown in FIG. 5, $\phi_6$ as shown in FIG. 6, and $\phi_5$ as described above will be well known to those skilled in the art of logic design, and therefore need not be further described.

Figure 8:
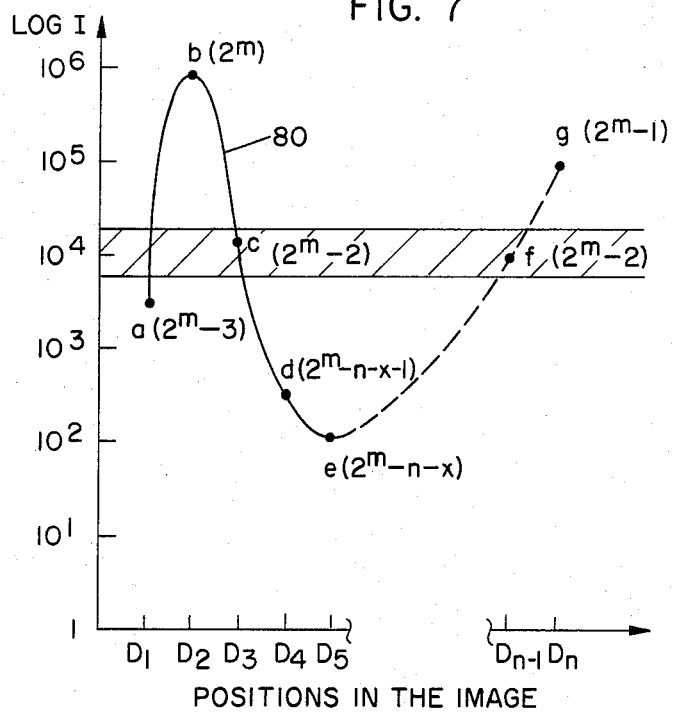
FIG. 8 is a graphical representation of the light intensity distribution received by the photosensors of a photosensor array, illustrating the ordering of the light intensities sensed by the photosensors.

Turning now to FIG. 8, there is shown a graphical representation of the light intensity distribution of an arbitrary one-dimensional image illustrative of the sequential ordering of the detector/converters according to the light intensities received by the photodiodes in the detector/converters. The vertical axis represents in a logarithmic scale the light intensity in arbitrary units. The horizontal axis represents the position along the image with the positions of the detector/converters D1–Dn indicated. The points on the curve 80, which are labeled "a" through "g", represent the light intensities received by the photodiodes in D1 through D5, Dn−1 and Dn, respectively. Indicated in parenthesis next to each point is the number which is stored in binary in a row of memory elements corresponding to the detector/converter represented by the point to indicate the rank according to intensity of the light received by that detector/converter. For example, in FIG. 8 the detector/converter D2 receives the highest light intensity as represented by point b, and the largest number $2^m$ is stored in binary in the row of memory elements corresponding to D2. The detector/converter Dn receives the next hightest intensity as represented by point g. Therefore, the next largest number $2^m-1$ is stored in binary in the row of memory elements corresponding to Dn. It is noted that although the light intensity received by detector/converter D3 as represented by point c, is higher than the light intensity received by detector/converter Dn−1 as represented by point f, the same number $2^m-2$ is stored in the two rows of memory elements corresponding to D3 and Dn−1. The reason for the points c and f being assigned the same position in the rank order of light intensities is that the two points fall within a range of intensities which when received by the detector/converters results in the occurrence of respective "0" to "1" transitions within the same interval between two $\phi_4$ pulses. One such range of intensities is illustrated as a shaded band in FIG. 8. The width of such bands can be reduced by reducing period of the $\phi_4$ signal. However, a reduction in the period of the $\phi_4$ signal will require proportional reductions in the periods of the other clock signal provided by the sequence control circuit 30.

Figure 9:
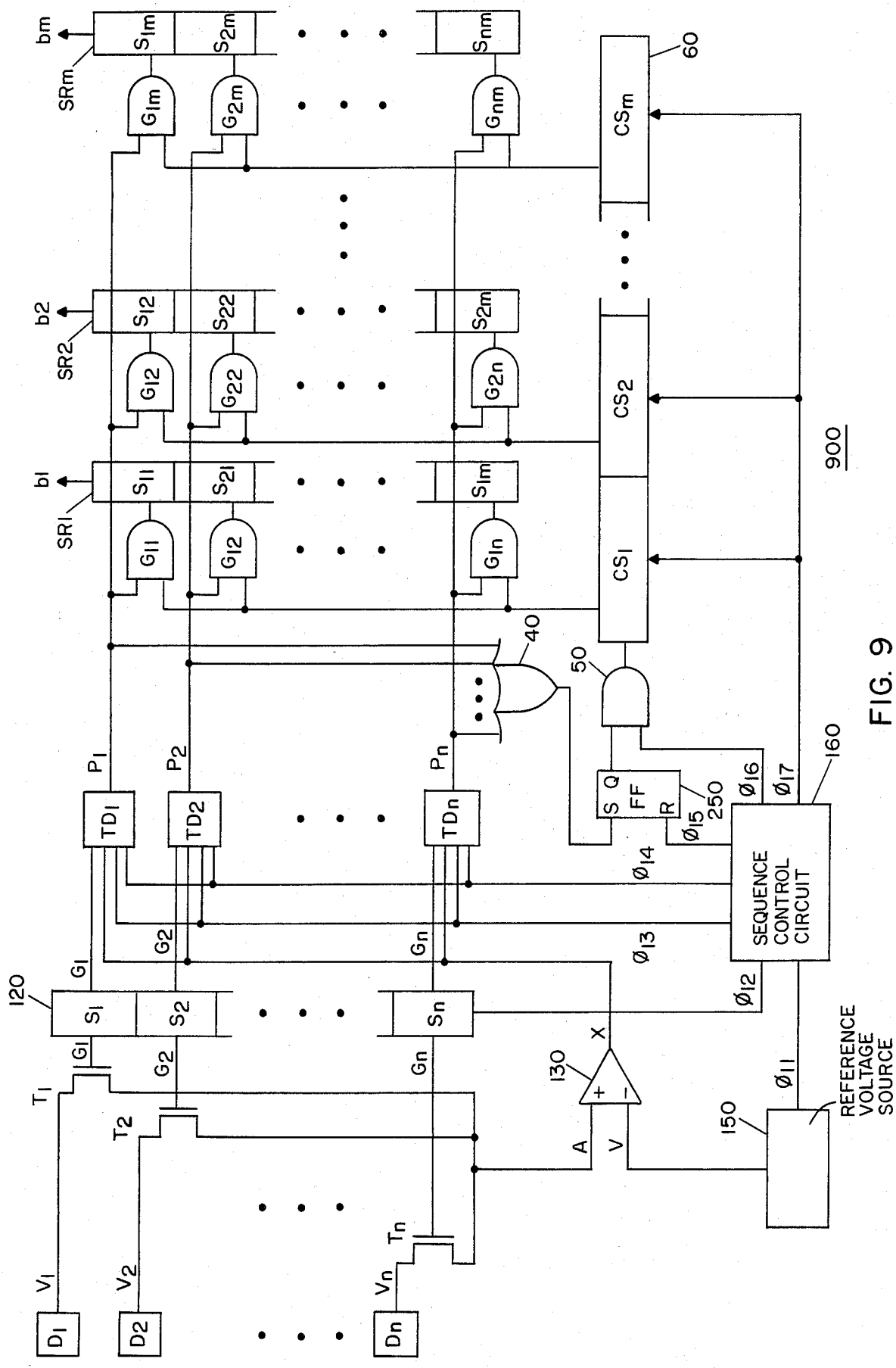
FIG. 9 is a schematic block and logic diagram of an image sensing system according to an alternative embodiment of the present invention.

Referring now to FIG. 9, there is shown an image sensing system 900 according to an alternative embodiment of the present invention. The same reference characters and numerals used in FIG. 2 are again used in FIG. 9 to denote like components and parts of the system. As in the case of the imaging system of FIG. 2, the system 900 includes m shift registers SR1–SRm, each having n stages. The shift register stages form a matrix of memory elements S11–Snm having n rows and m columns. Each memory element having an associated 2-input AND gate G11–Gnm connected to provide its output to the memory element. The shift registers SR1–SRm are adapted to have their contents shifted out serially through their respective outputs b1–bm by the application of appropriate signals to proper terminals (not shown in FIG. 9) on each shift register. The shift register stages S11–Snm forming the memory elements of the matrix may be all set to a "1" by the application of appropriate signals to a set terminal (not shown in FIG. 9) on each shift register. Also similar to the system of FIG. 2, the system 900 includes a binary down-counter 60 having m stages, CS1–CSm. Each stage of the counter corresponds to one column of the matrix of memory element, and has its output connected to one input of each AND gate associated with a memory element of the corresponding column. The counter stages CS1–CSm may be all set to "1" by a signal $\phi_{17}$ provided by a sequence control circuit 160. The counter 60 receives the output from a 2-input AND gate 50 for decrementing the counter.

Unlike the system of FIG. 2, the system 900 uses an array of n (where n is a relatively large whole number) photosensors d1–dn arranged in an array in the focal plane of an imaging system (not shown in FIG. 9). Each photosensor is adapted to sense the light intensity in a respective portion of an image in the focal plane and provide a voltage V1–Vn representative of the sensed light intensity. The outputs of the photodetectors d1–dn are coupled through respective transfer gates T1–Tn to one input A of a conventional voltage comparator 130. The other input B of the comparator 130 is connected to a reference voltage source 150. The reference voltage source provides a reference voltage V which can be monotonically decreased from a maximum value to a minimum value in regular amounts under the control of a $\phi_{11}$ signal from the sequence control circuit 160. The design of such reference voltages sources, which are sometimes referred to as staircase generators, is well known to those skilled in the art of logic circuit design, and therefore need not be further described. The comparator 130 compares the voltage on its two inputs A and B, and provides a "0" at its output if the voltage on input A is less than the voltage on input B. If the voltage on input A is greater than that on input B, the comparator 130 provides a "1". The output x of the comparator 130 is provided to n transition detection circuits TD1-TDn. Each transition detection circuit is associated with a respective one of the photodetectors d1-dn.

The transfer gates T1-Tn coupling respective photosensors d1-dn to the A input of the comparator 13 are sequentially driven to the ON state, one at a time, by respective gating signal g1-gn provided by a shift register 120. The shift register 120 has n stages S1-Sn, and is adapted to propogate a "1" state successively from stage S1 to stage Sn during a sampling cycle. The shifting in the shift register 120 is controlled by a $\phi_{12}$ clock signal from the sequence control circuit 160. The design of such a shift register is well known to those skilled in the art of logic circuit design, and need not be further described.

Each of the transition detection circuits TD1-TDn also receives the same gating signal provided by the shift register 120 to the transfer gate connected to its associated photosensor. In addition, each transition detection circuit also receives $\phi_{13}$ and $\phi_{14}$ clock signals from the sequence control circuit 160 and provides a pulse output P1-Pn upon detecting a "1" in the output signal x from the comparator 130. The outputs P1-Pn of the transition detection circuits are all provided to an n-input OR gate 40, which provides its output to the S input of a S-R flip-flop 250. The S-R flip-flop 250 receives a $\phi_{15}$ clock signal from the sequence control circuit 160 at its R input and provides its normal output Q to the 2-input AND gate 50. The other input of the AND gate 50 receives a $\phi_{16}$ clock signal from the sequence control circuit 160.

Figure 10:
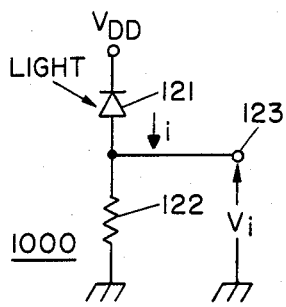
FIG. 10 is a schematic circuit diagram of a photosensor suitable for use in the image sensing system of FIG. 9.

Referring now to FIG. 10, there is shown a schematic circuit diagram of an exemplary photosensor 1000 suitable for use in the image sensing system of FIG. 9. The photosensor 1000 includes a photodiode 121 having its cathode connected to a $V_{DD}$ voltage supply and its anode connected to an output terminal 123 of the photosensor. A resistance 122 is connected between the output terminal 123 and ground. The photodiode, in response to received light, provides a photocurrent i approximately proportional to the intensity of the received light. The photocurrent i causes a voltage drop across the resistance which appears as an output voltage Vi at the output terminal 123. The ouput voltage Vi of the photodetector 1000 is approximately proportional to the received light intensity.

Figure 11:
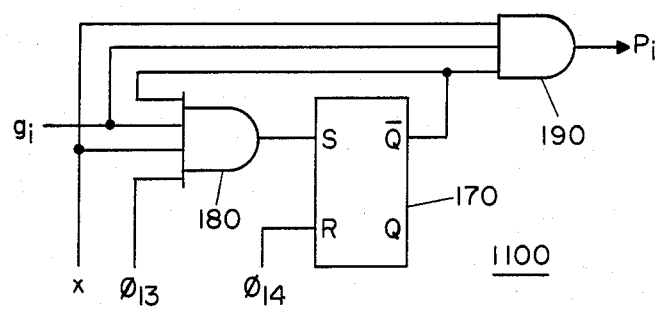
FIG. 11 is a schematic logic diagram of a transition detection circuit suitable for use in the image sensing system of FIG. 9.

Turning now to FIG. 11, there is shown a schematic logic diagram of an exemplary transition detection circuit 1100 suitable for use in the image sensing apparatus of FIG. 9. The transition detection circuit 1100 includes an S-R flip-flop 170 having S and R inputs and an inverted output $\overline{Q}$. In addition, the circuit 1100 includes a 3-input AND gate 190 and a 4-input AND gate 180. The AND gate 190 receives the inverted output $\overline{Q}$ from the flip-flop 170, the x signal from the comparator 130 and a gating signal gi from the shift register 120, and provides the output Pi of the transition detection circuit 1100. The AND gate 180 receives the inverted flip-flop output $\overline{Q}$, the gating signal gi, the comparator output x and the $\phi_{13}$ clock signal, and provides its output to the S input of the flip-flop 170. The R input of the flip-flop 170 receives the $\phi_{14}$ clock signal.

Figure 12:
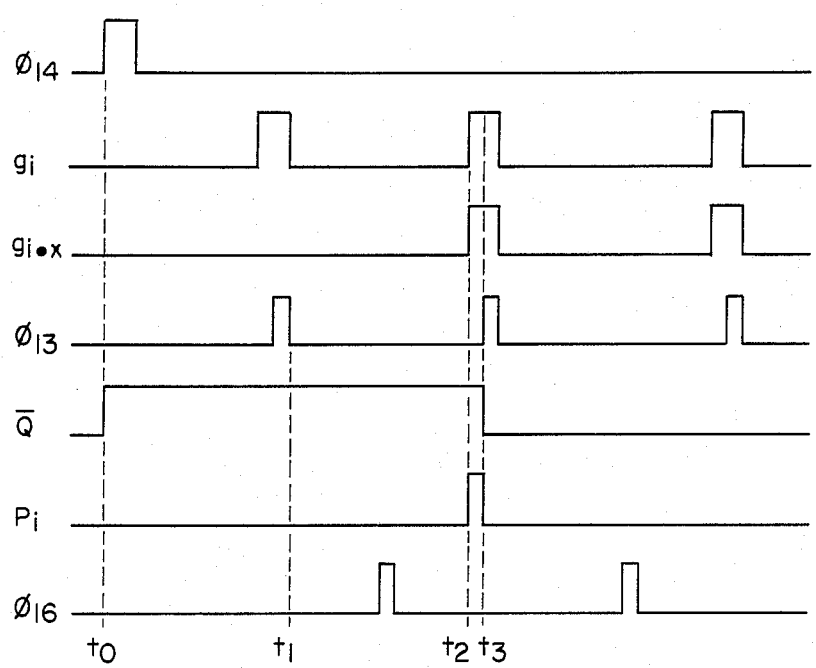
FIG. 12 illustrates the waveforms of the input, output, and internal signals of the circuit of FIG. 11, the waveforms being explanatory of the operation of that circuit.

Referring to FIG. 12, there are shown, waveforms representative of the input, output and internal signals of the circuit of FIG. 11. The operation of the circuit of FIG. 11 will now be explained with the aid of these waveforms. At the start of a scanning operation, at time $t_o$, the flip-flop 170 is reset by the $\phi_{14}$ signal, and the $\overline{Q}$ output of the flip-flop goes to a "1". Since the circuit 1100 responds to the x signal from the comparator 130 only during the interval when the gating signal gi is a "1", the waveform of the AND product of gi and x (i.e., gi·x) is illustrated, instead of the waveform of the x by itself. During each successive gi pulse, the output voltage of the photosensor associated with the transition detection circuit 1100 is compared to a reference voltage. The reference voltage is lowered by a predetermined amount after each gi pulse. If during one such gating pulse, the reference voltage is less than the output voltage of the photosensor, the signal gi·x will go to a "1", and thereafter becomes identical to the waveform of the gi signal. When gi·x goes to a "1" at time $t_2$, the output Pi of the transition detection circuit goes to a "1", and the AND gate 180 becomes enabled. Subsequently, at time $t_3$ when the $\phi_3$ signal goes to a "1", the output of AND gate 180 goes to a "1", causing flip-flop 170 to be reset and the output Pi to return to "0". Once the flip-flop 170 is reset, the AND gate 190 is disabled, and no further pulses are provided by the transition detection circuit 1100 until the flip-flop 170 is reset by $\phi_{14}$ at the start of the next scanning operation. Therefore, the transition detection circuit 1100 provides a pulse which begins when both x and gi are "1"s, and terminates with the leading edge of the $\phi_{13}$ pulse following the "0" to "1" transition of gi·x. It is noted in FIG. 12 that the $\phi_{13}$ pulses are synchronized with the gi pulses. The pulsewidth of the $\phi_{13}$ pulses are approximately one half of that of the gi pulses, and the trailing edges of the $\phi_{13}$ pulses are coincident with the trailing edges of the gi pulses.

Returning now to FIG. 9, the operation of the image sensing system 900 is now explained. At the beginning of a scanning operation, the reference voltage source 150 is initialized to provide the maximum reference voltage. The transition detection circuits TD1-TDn are all reset by the $\phi_{14}$ clock signal to have "0" outputs. The shift register 120 is initialized to begin providing gating signals gi-gn, starting with gi. The flip-flop 250 is initially reset by the $\phi_{15}$ signal. The counter 60 is initialized by the $\phi_{17}$ signal to a state where the output of each stage CS1-CSm is a "1", and the stages S11-Snm of the shift registers SR1-SRm are all initalized to a "0".

The transfer gates T1-Tn are then sequentially driven to the ON state by the gating signals gi-gn provided by the shift register 120, and the output voltages of the photosensors d1-dn are sequentially compared by the comparator 130 with the reference voltage provided by the reference voltage source 150. At the same time, the gating pulses gi-gn are also provided to the transition detection circuits TD1-TDn to enable each circuit to receive the output x of the comparator corresponding to a comparison made with the output voltage of its associated photosensor.

If one or more of the transition detection circuits TD1-TDn receive an x signal which is a "1" from the comparator 130 at the same time as receiving a respective gating signal, the output of each such circuit provides a pulse to the AND gates of its corresponding row of the matrix of memory elements, and thereby causes the state of the counter 60 to be stored in the memory elements of that row. Once a transition detection circuit has provided a pulse, it provides no further pulses for the remainder of the scanning operation.

The issuance of a pulse from any one of the transition detection circuits TD1-TDn causes the OR gate 40 to provide a "1" output, which sets the flip-flop 250. The setting of flip-flop 250 causes the AND gate 50 to be enabled, and therefore at the next occurrence of a $\phi_{16}$ pulse, the counter 60 is decremented to its next state. If none of the transition detection circuits TD1-TDn produce a pulse during a sampling cycle in which a complete sequence of gating pulses g1-gn are produced, the flip-flop 250 is not set, and the counter 60 is not incremented.

After the completion of a sampling cycle, the flip-flop 250 is reset by the $\phi_{15}$ clock signal, and the reference voltage source 150 receives a $\phi_{11}$ signal, which causes the reference voltage V provided thereby to be decreased by predetermined amount. Thereafter, a new sampling cycle begins in which those transition detection circuit or circuits TD1-TDn which have not previously produced a pulse respond to receiving an x signal which is a "1" at the same time as a respective gating signal by providing an output pulse. If one or more of the transition detection circuits provide a pulse during the sampling cycle, the counter state is stored in the memory elements of the row or rows corresponding to each such circuit, and the counter is decremented to its next state. It is noted in FIG. 12 that only one $\phi_{16}$ pulse is provided during each sampling cycle. Therefore, the counter 60 is decremented only once in each sampling cycle if one or more transition detection circuits provide output pulses during that interval. If no transition detection circuits provide output pulses during a sampling cycle, the counter is not decremented.

The process of lowering the reference voltage V provided by the reference voltage generator 150 and the initiation of new sampling cycles continue until the completion of the sampling cycle after the reference voltage has reached its minimum value. At that point, the scanning operation is competed, and each row of the matrix of memory elements stores a binary number indicative of the relative order in which the transition detection circuits TD1-TD2 provided their output pulses. If two or more transition detection circuits provide pulses in the same sampling cycle, those circuits have the same binary number stored in their corresponding rows, and therefore are assigned the same position in the ordering of the circuits. Those transition detection circuits which have not produced pulses at the end of the scanning operation all have the number zero stored in their corresponding rows of memory elements, and therefore are all assigned the lowest position in the order of the circuits. Since the order in which the transition detection circuits produce their pulses reflects the relative order of the intensities of the light received by their associated photodetectors d1-dn, the numbers stored in the rows of the matrix of memory elements also represent the relative order of the light intensities received by the photodetectors d1-dn. The numbers stored in the rows of the matrix may be read out by serially shifting out the contents of the shift register SR1-SRm through their respective outputs b1-bm.

The design of a sequence control circuit to provide the clock signals $\phi_1\phi_{17}$ as shown by the waveforms of FIG. 12 and as described above will be well known to those skilled in the art of logic circuit design, and therefore need not be further described.

As in the case of the image sensing system of FIG. 2, it is understood that an up-counter may be substituted for the down-counter used with appropriate modification which are obvious in view of the foregoing description to one skilled in the art, such as initializing the up-counter to a state where all of its stages have a "0" output at the beginning of a scanning operation, using inverters at the output of each counter stage, and initializing each of the memory elements S11-Snm to a "1" at the beginning of a scanning operation.

Figures 13, 14:
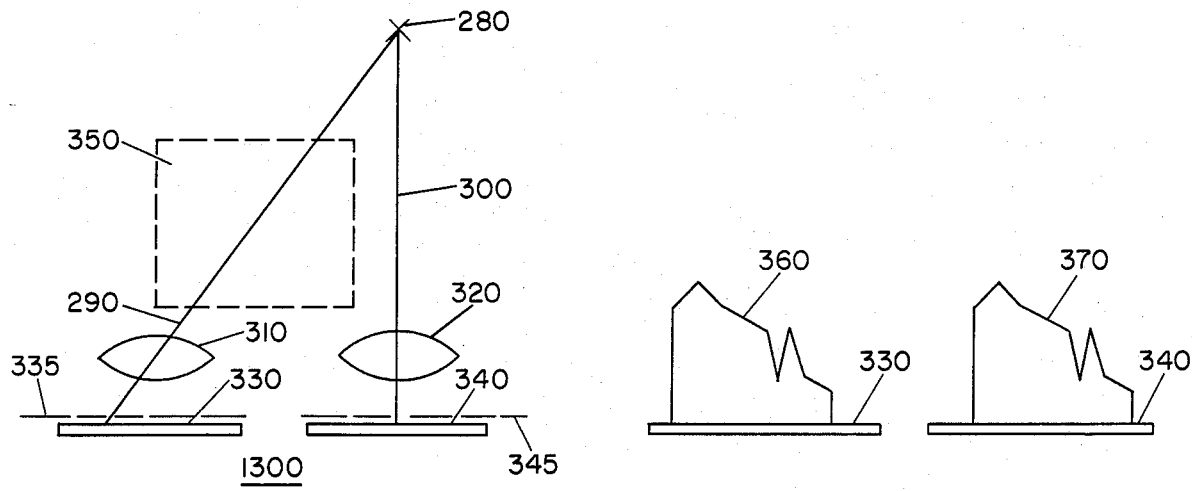
FIG. 13 is a schematic represenatation of the optical imaging systems of a range finder used in an automatic focussing apparatus.
FIG. 14 is a graphical representation of the light intensity distribution of the images formed by the optical imaging systems of FIG. 13.

Referring now to FIG. 13, there is shown a schematic represenation of the optical imaging systems 1300 of an exemplary automatic focussing apparatus which utilizes a range finder based on the triangulation principle. The imaging systems 1300 each comprise a lens 310 and 320, each of which forms an image of the same object 280 in its respective focal plane 335 and 345. An image sensing system 330 and 340 is situated in each of the focal planes 335 and 345, respectively. The structure of the image sensing systems 330 and 340 are either as described in FIG. 2 or as described in FIG. 9 above. The image at the focal plane 345 is formed via an optical path 300, which is coincident with the optical axis of the lens 320, while the image at the focal plane 335 is formed via an optical path which is at an angle with respect to the optical axis of the lens 310. Therefore, the two images are skewed with respect to each other in that each occupies a different portion of its respective focal plane. The skew of the two images may be removed by the use of an appropriate prism 350 in the optical path 290, which can be rotated and/or translated to alter the angle of the optical path 290 with respect to the optical axis of the lens 310. The amount of rotation and/or translation of the prism 350 required to remove the skew of the two images provides an indication of the distance between the imaging systems and the object 280.

Turning now to FIG. 14, there is shown graphical representations of the light intensity distributions 360 and 370 on the two image sensing apparatus 330 and 340, respectively. Owing to the skew of the images in their respective focal planes, the light intensity distributions received by the two systems are skewed with respect to each other. The skew in the light intensity distribution can be detected by comparing, row for row, the contents of the matrix of memory elements on each system. In so doing, the relative order of the light intensities received by the photosensors in the two image sensing systems are compared one to one. Such a comparison then serves as the basis for appropriately rotating and/or translating the prism in the range finder by means of a servosystem to achieve nearly identical contents in the memory elements of the two image sensing systems. The amount of rotation and/or translation of the prism necessary to remove skew in the two images of the range finder can in turn provide the basis for a focus adjustment in a camera by means of another servosystem.

It is understood that various modification and alterations, in addition to those described in the foregoing, may be made to the disclosed embodiments by one skilled in the art without departing from the spirit and scope of the present invention. For example, different logic elements or combinations thereof may be substited for the ones used to implement the disclosed embodiments while achieving substantially the same logical functions in the system. In addition, one or more random access memories (RAM's) with appropriate conventional circuitry for reading and writing its matrix of memory cells and for enabling the counter to address its columns may be substituted for the shift registers and AND gates as the matrix of memory element in the system.

We claim:

1. An image sensing apparatus comprising:

a plurality photosensors arranged in a focal plane of an optical imaging system, each photosensor being adapted to sense light intensity in a respective portion of an image formed in the focal plane and to provide an electrical signal representative of the light intensity sensed;

first means including a plurality of pulse generation means, each associated with a respective one of the photosensors, the first means being responsive to the electrical signals provided by the plurality of photosensor, and each pulse generation means for providing a logical pulse after an initial delay interval which is related to the light intensity sensed by its associated photosensor;

a plurality of memory means, each one corresponding to a respective one of the pulse generation means and adapted to store a multiple bit code;

second means responsive to the logical pulses provided by the plurality of pulse generation means for determining with respect to regular predetermined intervals the sequential order in which the logical pulses are provided and for storing a code in each of the memory means, indicative of the position in the sequential order in which the pulse from the pulse generation means corresponding to the memory means was provided, wherein the same code is stored in the memory means corresponding to two or more pulse generation means providing logical pulses within the same predetermined interval; and means for reading the codes stored in the memory means.

2. An image sensing apparatus according to claim 1 wherein the memory means comprise a plurality of memory elements arranged in a matrix having a plurality of columns and a plurality of rows, each row of memory elements corresponding to a respective one of the pulse generation means; and the second means comprises counter means having a plurality of stages, each one corresponding to a respective column of the matrix and coupled to enable the memory elements of its corresponding column to change logical state when the corresponding stage of the counter is in a first logical state, third means responsive to one or more pulses provided by the pulse generation means during one of the predetermined intervals for advancing the state of the counter means at the end of that predetermined interval, and means coupling each pulse generation means to the memory elements of its corresponding row for changing the logical state of those memory elements in the corresponding row which are enabled to change state.

3. An image sensing apparatus according to claim 2 wherein each of the pulse generation means comprises converter means responsive to the electrical signal of the associated photosensor for providing a logical pulse which terminates after a duration which is approximately inversely proportional to the light intensity sensed by the associated photosensor, and transition detection means responsive to the converter means for providing a logical pulse output which begins upon termination of the logical pulse from the converter means and terminates at the end of one of the predetermined intervals in which the termination of the logical pulse of the converter means occurs; and the third means comprises first gating means responsive to the transition detection means of each of the pulse generation means for providing an output which is the OR logic function of the outputs of the transition detection means, clock means providing a sequence of logical pulses, one occurring during each one of the predetermined intervals, and second gating means responsive to the output of the first gating means and the clock means for providing an output which is the AND logic function of the output of the first gating means and the clock means, the output of the second gating means being provided to the counter means.

4. An image sensing apparatus according to claim 3 wherein the plurality of memory elements comprise a plurality of shift registers, each one associated with a respective column of the matrix and having a plurality of shift register stages, each stage being associated with a respective row of the matrix and coupled to a respective one of a plurality of AND gates, each one of the plurality of AND gates having one input coupled to the counter stage corresponding to the column associated with the shift register stage coupled to the AND gate and having another input coupled to the transition detection means of the pulse generation means corresponding to the row associated with the shift register stage coupled to the AND gate; and the means for reading the codes stored in the memory means comprises the outputs of the shift registers through which the logical states of the stages of respective shift registers are serially shifted out.

5. An image sensing apparatus according to claim 4 wherein the counter means is a binary counter and the codes stored in the rows of shift register stages are binary numbers indicative of the sequential order in which the logical pulses of the plurality of pulse generation means are provided.

6. An image sensing apparatus according to claim 5 wherein each photosensor comprises a photodiode providing a photocurrent approximately proportional to the light intensity received thereby; each converter means comprises a capacitance coupled to the photodiode of its associated photosensor at a common node, inverter means having an input coupled to the common node and an output providing the logical pulse of the converter means, and gating means operatively coupling the common node to a voltage supply connection; and each transition detection means comprises a flip-flop having a set input, a reset input and an inverted output, a first AND gate having an output coupled to the set input of the flip-flop, one input coupled to receive the logical pulse of the converter means and another input coupled to the inverted output of the flip-flop, and a second AND gate having an output providing the logical pulse of the transition detection means, one input coupled to receive the logical pulse of the converter means and another input coupled to the inverted output of the flip-flop.

7. An image sensing apparatus according to claim 2 wherein each one of the photosensors provides a voltage approximately proportional to the light intensity sensed thereby; the first means comprises comparator means for sequentially sampling the voltages of each photosensor during each of the regular predetermined intervals and for comparing the sampled voltages with a reference voltage, the reference voltage being monotonically changed by a predetermined amount after each predetermined interval until a final value is reached; each pulse generation means comprises a transition detection means responsive to the comparator means for providing a logical pulse output when the voltage of its associated photosensor exceeds the reference voltage; and the third means comprises first gating means responsive to the transition detection means of each pulse generation means for providing an output which is the OR logic function of the outputs of the transition detection means, flip-flop means storing the output of the first gating and being reset at the end of each one of the predetermined intervals, clock means providing a sequence of logical pulses, one occurring during each one of the predetermined intervals, and second gating means responsive to the flip-flop means and the clock means for providing an output which is the AND logic function of the state of the flip-flop means and the clock means, the output of the second gating means being provided to the counter means.

8. An image sensing apparatus according to claim 7 wherein the plurality of memory elements comprise a plurality of shift registers, each one associated with a respective column of the matrix and having a plurality of shift register stages, each stage being associated with a respective row of the matrix and coupled to a respective one of a plurality of AND gates, each one of the plurality of AND gates having one input coupled to the counter stage corresponding to the column associated with the shift register stage coupled to the AND gate and having another input coupled to the transition detection means of the pulse generation means corresponding to the row associated with the shift register stage coupled to the AND gate; and the means for reading the codes stored in the memory means comprises the outputs of the shift registers through which the logical states of the stages of respective shift registers are serially shifted out.

9. An image sensing apparatus according to claim 8 wherein the counter means is a binary counter and the codes stored in the rows of shift register stages are binary numbers indicative of the sequential order in which the logical pulses of the plurality of pulse generation means are provided.

10. An image sensing apparatus according to claim 9 wherein each one of the plurality of photosensors comprises a photodiode coupled between a voltage supply connection and a common node, a resistance coupled between the common node and ground; the comparator means comprises a shift register for generating a sequence of gating signals, a reference voltage source for providing the reference voltage, a comparator having a first and a second input and an output, the first input of comparator being coupled to the reference voltage source, the output of the comparator providing a logical signal when the voltage at its second input exceeds the reference voltage, and a plurality of transfer gates each one coupled between the common node of a respective photosensor and the second input of the comparator and being responsive to a respective one of the gating signals for coupling the voltage at the common node of the respective photosensor to the second input of the comparator; and the transition detection means of each pulse generation means comprises a flip-flop having a set input, a reset input and an inverted output, a first AND gate having a first input coupled to the inverted output of the flip-flop, a second input coupled to the output of the comparator, a third input coupled to receive the same gating signal as received by the transfer gate coupled to the photosensor associated with the pulse generation means and an output providing the logical pulse of the transition detection means, and a second AND gate having first, second and third inputs coupled in common with the first, second and third inputs of the first AND gate, respectively, and an output coupled to the set input of the flip-flop.

* * * * *

UNITED STATES PATENT AND TRADEMARK OFFICE
CERTIFICATE OF CORRECTION

PATENT NO. : 4,529,886

DATED : July 16, 1985

INVENTOR(S) : Shotaro Yokoyama et al.

It is certified that error appears in the above-identified patent and that said Letters Patent is hereby corrected as shown below:

First page, Item 73, change "Kawasaki" to --and Fuji Electric Company, Ltd., both of Kanagawa--;
Column 1, line 43, after "now" insert --be--;
Column 2, line 14, after "solution" delete --is--;
Column 2, line 38, "represenative" should read --representative--;
Column 3, line 41, "represenatation" should read --representation--;
Column 5, lines 29-30, "transisitor" should read --transistor--;
Column 8, line 1, "gate" should read --gates--;
Column 9, line 66, "hightest" should read --highest--;
Column 13, line 67, "$\phi 1 \phi 17$" should read --$\phi 1 - \phi 17$--;
Column 14, line 14, "represenation" should be --representation--;
Column 14, lines 65-66, "substitited" should read --substituted--;
Column 15, line 9, after "plurality" insert --of--;
Column 15, line 19, "photosensor" should read --photosensors--;
Column 17, line 12, after "gating" insert --means--;
Column 18, line 16, before "comparator" insert --the--.

Signed and Sealed this

Fourth Day of October, 1988

Attest:

DONALD J. QUIGG

Attesting Officer      Commissioner of Patents and Trademarks